(12) United States Patent
Crawford (10) Patent No.: US 10,495,134 B1
(45) Date of Patent: Dec. 3, 2019

(54) HANGER CHAIN WITH MATING HOOKS

(71) Applicant: Joanne Crawford, Amesbury, MA (US)

(72) Inventor: Joanne Crawford, Amesbury, MA (US)

( * ) Notice: Subject to any disclaimer, the term of this patent is extended or adjusted under 35 U.S.C. 154(b) by 0 days.

(21) Appl. No.: 15/987,538

(22) Filed: May 23, 2018

(51) Int. Cl.
| | |
|---|---|
| *F16M 11/00* | (2006.01) |
| *F16B 45/00* | (2006.01) |
| *F16B 1/00* | (2006.01) |
| *A47G 7/04* | (2006.01) |
| *F16M 13/02* | (2006.01) |

(52) U.S. Cl.
CPC .............. *F16B 45/00* (2013.01); *A47G 7/045* (2013.01); *F16B 1/00* (2013.01); *F16M 13/02* (2013.01); *F16B 2001/0035* (2013.01)

(58) Field of Classification Search
CPC ........ F16B 45/00; F16B 45/025; F16B 45/06; F16B 45/04
See application file for complete search history.

(56) References Cited

U.S. PATENT DOCUMENTS

| 1,420,949 | A | * | 6/1922 | Schindler | ................ | B60C 27/08 24/598.5 |
| 1,668,325 | A | * | 5/1928 | Kreutz | .................... | B60C 27/08 24/598.5 |
| 9,777,763 | B2 | * | 10/2017 | Mitchell | ................ | F16B 45/04 |

* cited by examiner

*Primary Examiner* — Amy J. Sterling
(74) *Attorney, Agent, or Firm* — Coleman & MacDonald Law Office (57) ABSTRACT

A chain including a pair of hooks, the first hook having a first hook end and a first link end, the first hook end defining a first hook for suspending an article therefrom, the first link end defining a first link member for coupling the first hook to a chain. The chain including a second hook having a second hook end and a second link end, the second hook end defining a second hook for suspending an article therefrom, the second link end defining a second link member for coupling the second hook to the chain. The first and second hooks including first and second couplers respectively, the first and second couplers configured to connect one to the other for attaching the first hook adjacent to the second hook, the first and second hooks forming a continuous hook member when coupled adjacent one to the other.

14 Claims, 8 Drawing Sheets

HANGER CHAIN WITH MATING HOOKS

FIELD OF THE INVENTION

The present invention relates generally to a chain and hooks and more particularly to a chain having mating hooks, one attached to each end of the chain. The chain for use in hanging articles from a tree, post or other structure, or for other purposes.

BACKGROUND OF THE INVENTION

The statements in this section merely provide background information related to the present disclosure and may not constitute prior art.

Prior art chains and hooks are well known and useful for hanging tools, potted plants, decorations and other items from trees, poles, wall hooks or other stationary objects. Most prior art chains include separate hooks which must be independently coupled to a chain or hook attached to an object to be suspended from the chain. Wrapping both hooks around a tree branch or other support member and attaching two separate hooks to the object to be suspended can be tricky as one may need to attempt to grasp both ends of the chain while holding the object to be suspended.

In other applications wherein a chain may be looped around an object for towing or otherwise supporting the object, the hooks at each end of the chain must be separately hooked to another chain or a support structure.

Accordingly, it is an object of the present teachings to provide a chain and mating hooks that overcomes the above-identified shortcomings of prior art chains.

SUMMARY OF THE INVENTION

This section provides a general summary of the disclosure and does provide a comprehensive description or include full scope or all the features of the subject matter disclosed.

According to one aspect, the present teachings provide pair of hooks for use with a chain including a first hook having a first hook end and a first link end, the first hook end defining a first hook for suspending an article therefrom, the first link end defining a first link member for coupling the first hook to an end of a hanger chain, the first hook including a first body portion disposed between the first hook and the first link member, the first body portion defining a first coupler extending outwardly from the first body portion. A second hook is provided and includes a second hook end and a second link end, the second hook end defining a second hook for suspending an article therefrom, the second link end defining a second link member for coupling the second hook to an end of a hanger chain. The second hook including a second body portion disposed between the second hook and the second link member, the second body portion defining a second coupler extending outwardly from the second body portion. The first and second couplers configured to connect one to the other for attaching the first hook adjacent to the second hook, the first and second hooks forming a continuous hook member when coupled adjacent one to the other.

In another aspect a chain is disclosed, the chain including a pair of hooks as described above and including a plurality of chain links coupled one to the other forming a linked chain between the hooks. The chain being lengthwise adjustable by adding or removing links from the chain.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description, the appended claims and the following drawings. The drawings are for illustrative purposes only and are not intended to limit the scope of the present disclosure.

DETAILED DESCRIPTION OF EMBODIMENTS OF THE INVENTION

Detailed illustrative descriptions of example embodiments are disclosed herein. However, specific structural and functional details disclosed herein are merely representative for purposes of describing example embodiments. The example embodiments may be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected," "coupled," "mated," "attached," or "fixed" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the language explicitly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Reference numbers may be used in multiple embodiments shown in one or more figures to represent the same or similar elements in the embodiments. Thus, the same reference number may be used in multiple embodiments to identify similar parts in each of the embodiments.

Figure 1:
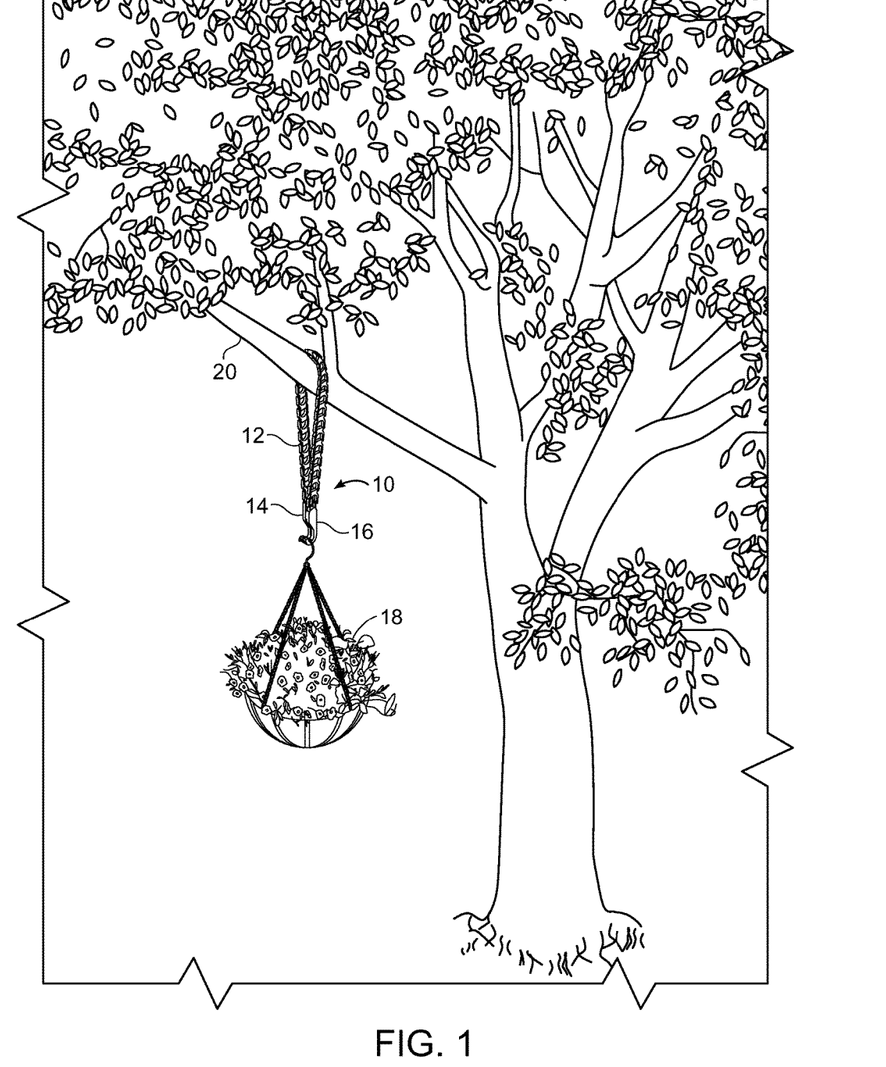
FIG. 1 is a perspective view of one embodiment of a chain in accordance with the present invention shown as used to support a hanging pot suspended from a tree branch.

FIG. 1 shows an embodiment of a hanger chain 10 in accordance with the present invention, as used to suspend a hanging pot 18 from a tree branch 20. The hanger chain 10 including a pair of mating first and second chain hooks 14 and 16 and a chain 12, each end of the chain 12 connected to one of the chain hooks.

Figure 2A:
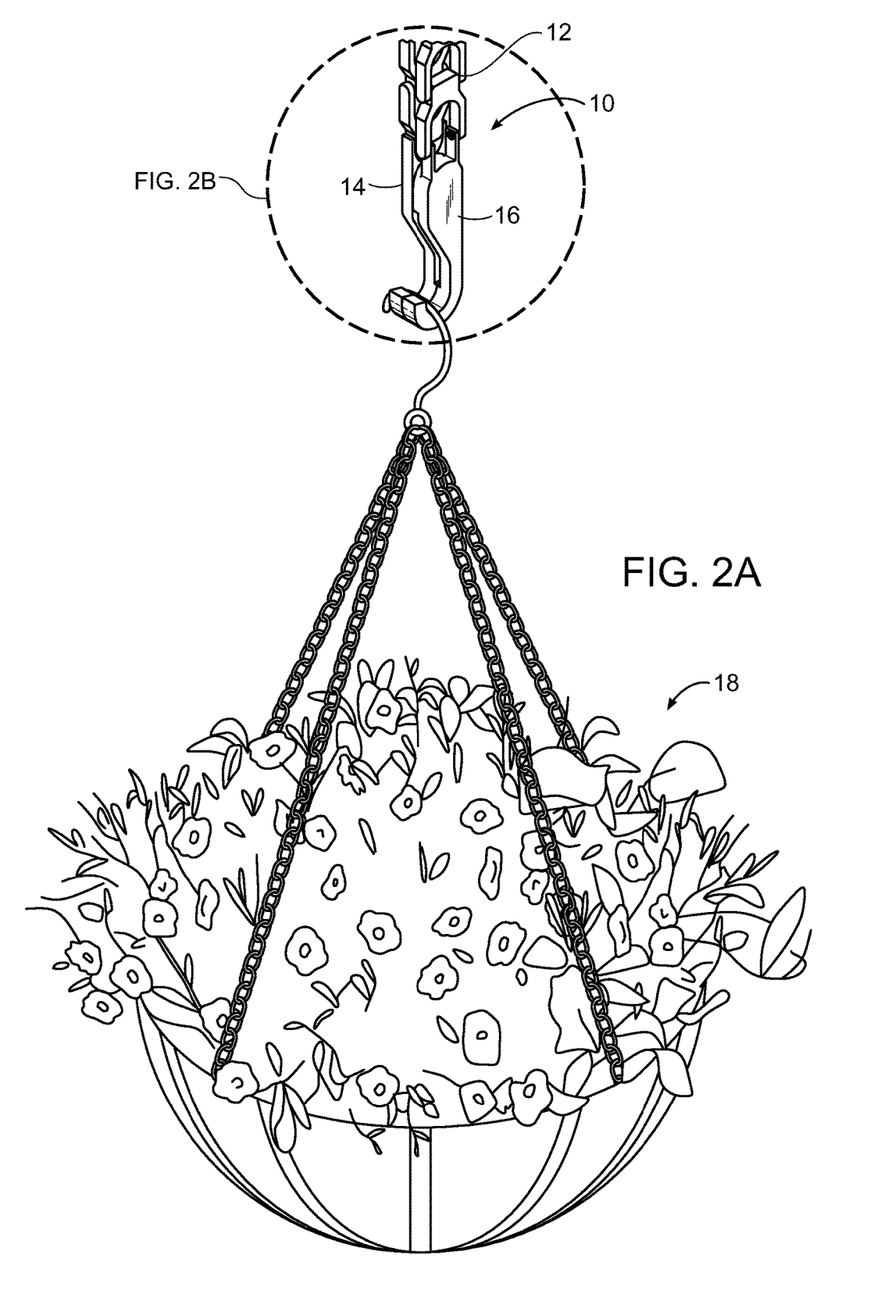
FIG. 2A is an enlarged perspective view of a portion of the chain and hanging pot of FIG. 1A.
Figure 2B:
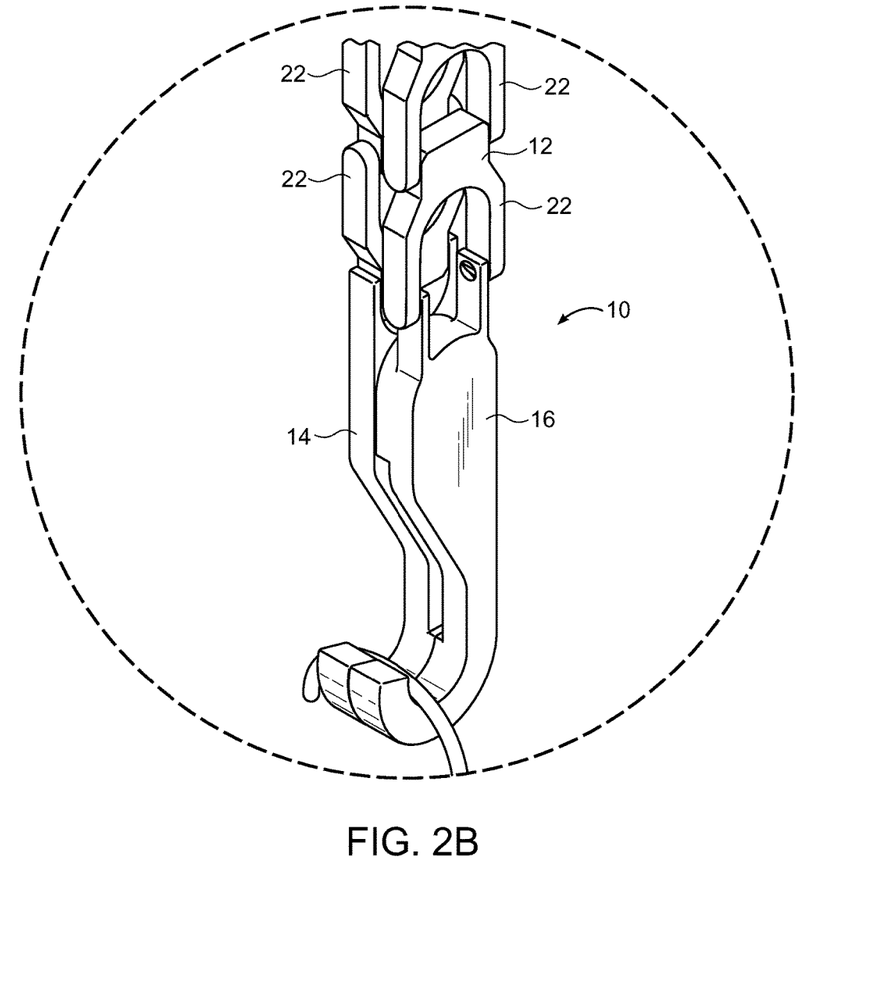
FIG. 2B is a detail view of a portion of the chain and chain hooks of FIG. 2 A.

FIG. 2A shows an enlarged view of the hanging pot 18 with the chain hooks 14 and 16 identified in a detail circle 2B.

As shown in more detail in FIG. 2B, the hanger chain 10 includes first and second mating chain hooks 14, 16 respectively, shown coupled one to the other as described further hereinafter. The chain 12 includes a plurality of links 22 coupled together to form a length adjustable chain. The chain 12 can be lengthened or shortened by adding or removing one or more of the links 22 as discussed further herein following.

Figure 3:
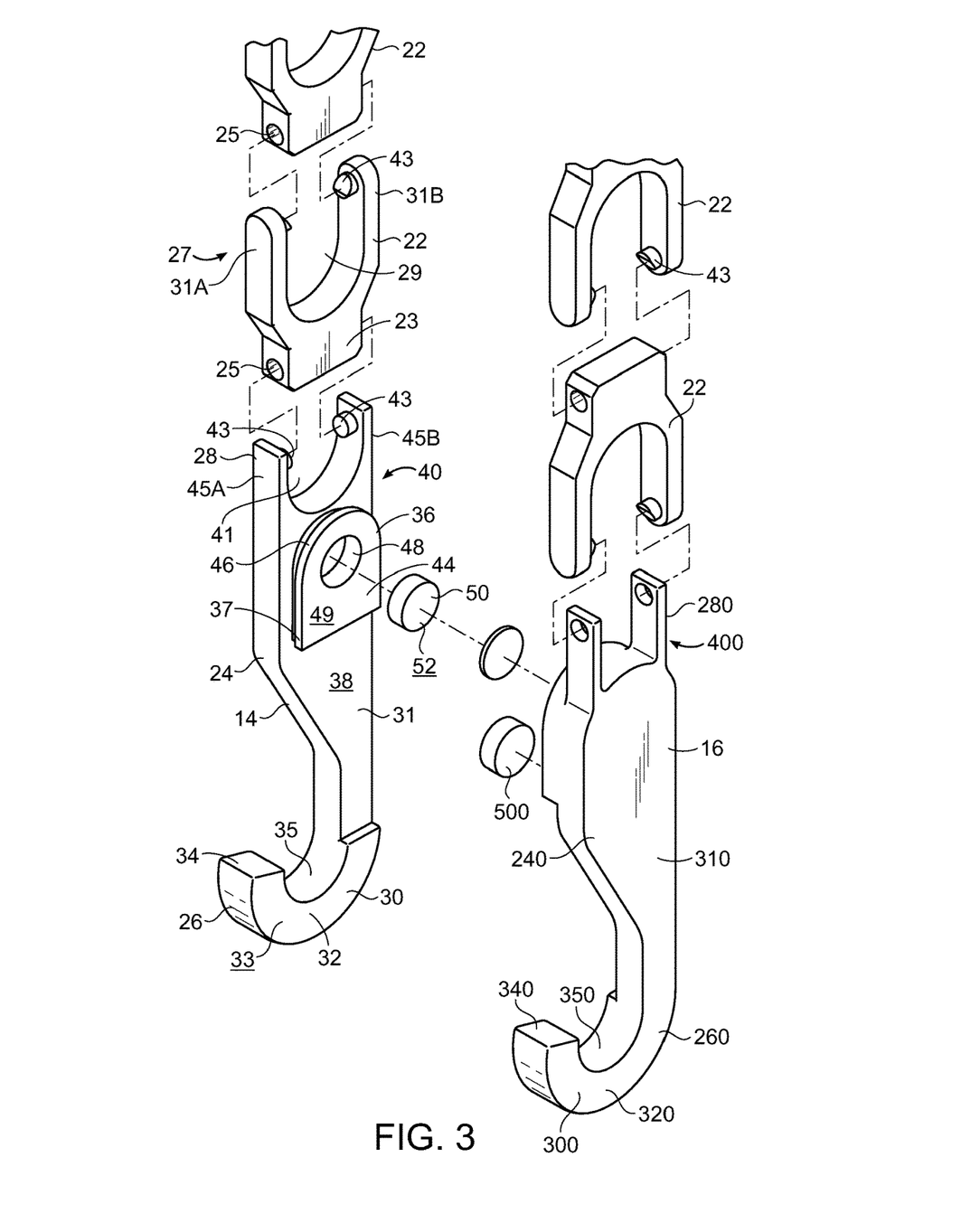
FIG. 3 is an exploded front side perspective view of the chain hooks and chain portions of FIG. 2 B.

Referring to FIG. 3, the first chain hook 14 includes a first hook body 24 defining a first hook end 26 and a first link end 28. The first hook body 24 defines a first hook 30 formed at the first hook end 26 of the first hook body. The first hook 30 includes a semi-circular shaped member 32 for receiving another hook or chain in the arch 35 thereof; for supporting an article from the first hook. The semi-circular member 32 defining a terminal end 34 of the first hook body 24.

The first hook body 24 includes a tapered portion 31 disposed between the first hook end 26 and the first link end 28 wherein a width of the first body portion 26 is narrowed at the first hook end to allow for the opening of the first hook 30 formed by the semi-circular shaped member 32. The semi-circular shaped member 32 defining an inner surface 33 which generally defines a plane.

Figure 4:
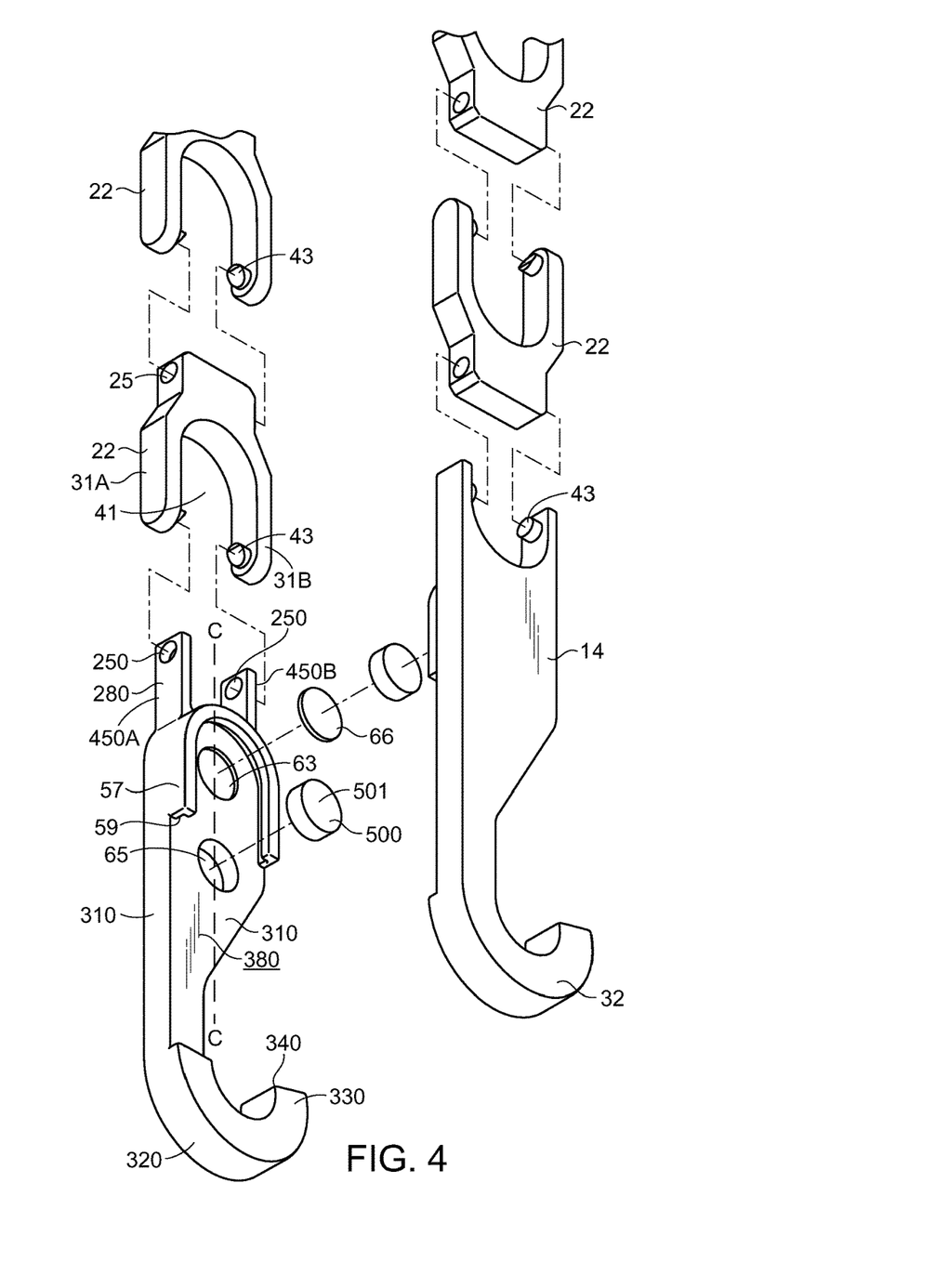
FIG. 4 is an exploded rear side perspective view of the chain hooks and chain portions of FIG. 2 B.

The first link end 28 defines a first link member 40 for coupling the first chain hook 14 to a link 22 of the chain 12. In the illustrated embodiment, the first link member 40 defines an opening 41 for receiving a male end 23 of a chain link 22. The first link member 40 includes a pair of legs 45A, 45B extending outwardly from the first body portion 26, the link opening 41 formed between the legs 45A, 45B. As shown in FIG. 3, the first link member 40 further defines a pivot pin 43 extending outwardly and generally perpendicular to an end portion of each leg 45A, 45B and into the link opening 41 for pivotably coupling a link 22 to the first chain hook 14. Each of the pivot pins 43 configured to be insertable in a corresponding aperture 25 defined by the male end 23 of the link 22. As shown in FIG. 4, the pivot pins 43 of the first chain hook 14 define a cylindrical shape so as to securely attach a link 22 to the first chain hook.

As will be evident to one skilled in the art, the chain links 22 are easily insertable and removable from the chain 12 so that the chain 12 is length adjustable. The adjustable length hanger chain 10 facilitates suspending a potted plant 18 from a vertical disposed trunk or branch of a tree wherein the length of the hanger chain 10 can be configured to be slightly longer than a circumference of a vertical trunk or branch of the tree.

Still referring to FIG. 3, the link 22 further includes a female end 27, opposite the male end 23 which defines an opening 29 for receiving the male end 23 of a next link 22. Similar to the opening 41 defined by the first link member 40, each of the links 22 define a female end 27 and include a pair of pivot pins 43 extending inwardly from each leg 31A, 31B of the female end. In one embodiment, the pivot pins 43 define an angled end for facilitating the insertion of the male end 23 of a next link 22 between the legs 45 of the first link member 40. Each of the pivot pins 43 configured to be insertable in a corresponding aperture 25 defined by the male end 23 of the link 22. The links 22 are pivotable relative to a next link 22 in the chain 12 about the pivot pins 43. Thus, the chain 12 is flexible for wrapping about a tree branch 20 or another object.

Still referring to FIG. 3, the first hook body 26 further defining a protrusion 36 extending outwardly from an inner sidewall 38 of the first hook body. The protrusion 36 forming a coupler for attaching the chain hook 14 to the second chain hook 16. In the illustrated embodiment the protrusion 36 defines a rectangular shape 44 at one end of the protrusion 36 and an arch 46 at the opposing end of the protrusion nearest the first link end 28 of the first hook 14. A flange 37 extends radially outwardly from the end of the protrusion 36 and extends about the arch 46 and continues along the sides of the rectangular shape 44 of the protrusion. The protrusion 36 defines a planar outer surface 49 disposed generally parallel to a plane of the inner sidewall 38 of the first hook body 26.

As shown in FIG. 3, the protrusion 36 defines a magnet opening 48 for receiving a first magnet 50 fixedly attached to the first chain hook 14. The first magnet 50 may be a permanent magnet and defines a magnetic surface 52 located flush with the planar surface 49 of the protrusion 36 when the first magnet is mounted within the magnet opening 48 and fixedly attached to the first chain hook 14. In the FIG. 3 embodiment, the first magnet 50 is cylindrical in shape, however, in other embodiments, the first magnet 50 may be rectangular, or another shape. In one embodiment, the first magnet 50 may be secured within the magnet opening 48 via an adhesive (not shown) or the first magnet may be sized to be press fit to secure the first magnet within the magnet opening 48.

Referring to FIGS. 3 and 4, the second chain hook 16 includes a second hook body 240 defining a second hook end 260 and a second link end 280. The second hook body 26 defines a second hook 300 formed at the second hook end 260 of the second hook body. The second hook 300 includes a second semi-circular shaped member 320 for receiving another hook or chain for supporting an article from the second hook. The second semi-circular member 320 defining a second terminal end 340 of the second hook body 240.

The second semi-circular member 320 defining a second arch 350 for receiving a hook or chain of the article to be supported by the second chain hook 16.

The second hook body 240 includes a tapered portion 310 disposed between the second hook end 260 and the second link end 280 wherein a width of the second hook body 240 is narrowed at the second hook end to allow for the opening of the second hook 300 formed by the second semi-circular shaped member 320. The second semi-circular shaped member 320 defining a second inner surface 330 which generally defines a plane. The plane of the second inner surface 330 configured to abut the first inner surface 33 of the first chain hook 14 when the first and second chain hooks 14, 16 respectively are coupled one to the other.

The second link end 280 defines a second link member 400 for coupling the second chain hook 16 to a link 22 of the chain 12. In the illustrated embodiment, the second link member 400 defines a pair of legs 450A, 450 B extending axially outwardly from at the second link end 280 of the second chain hook 16. The legs 450A, 450B being spaced apart to fit between the legs 31A and 31B of a link 22. The legs 450A, 450B each define openings 250, 250 for receiving the pivot pins 43 of the female end 27 of a link 22. The second link member 400 for removably coupling the second chain hook 16 to an end of the chain 12. As discussed above, a length of the chain 12 can be extended or shortened by adding or removing links 22 from between the first and second chain hooks 14 and 16 respectively.

As shown in FIG. 4, the second hook body 240 defines a coupler member for attaching the second chain hook 16 to the first chain hook 14, including an arcuate member 57 extending about an arched end 59 of the second hook body and outwardly from an inner sidewall 380 of the second hook body. The arcuate member 57 defines a groove 59 configured to receive the flange 46 of the protrusion 36 of the first chain hook 14 when the first and second chain hooks 14, 16 are coupled one to the other.

Still referring to FIG. 4, an upper portion of the second hook body 240 defines first and second apertures 63 and 65 disposed along a center line C-C of the upper portion of the second hook body 240. A metallic or ferromagnetic plate 66 is disposed in the first aperture 63 and configured to align with and magnetically couple to the first magnet 50 when the first and second chain hooks 14, 16 respectively are near one another and/or coupled together. The plate 66 having a planar face 67 disposed generally flush with the inner sidewall 380 of the second hook body 240 when the plate is mounted in the second aperture 65.

A second magnet 500 is disposed in the second aperture 65 and fixedly attached via adhesive or press fit to the second hook body 240. The second magnet 500 defining a magnetic surface 501 arranged with a polarity opposite that of the surface 52 of the first magnet 50. Accordingly, the first and second magnets 50, 501 respectively are arranged so that the inner sidewalls 38, 380 of the first and second hook body 24, 240 are attracted one to the other via magnetic force when the first and second chain hooks 14, 16 are near one another.

Figure 5:
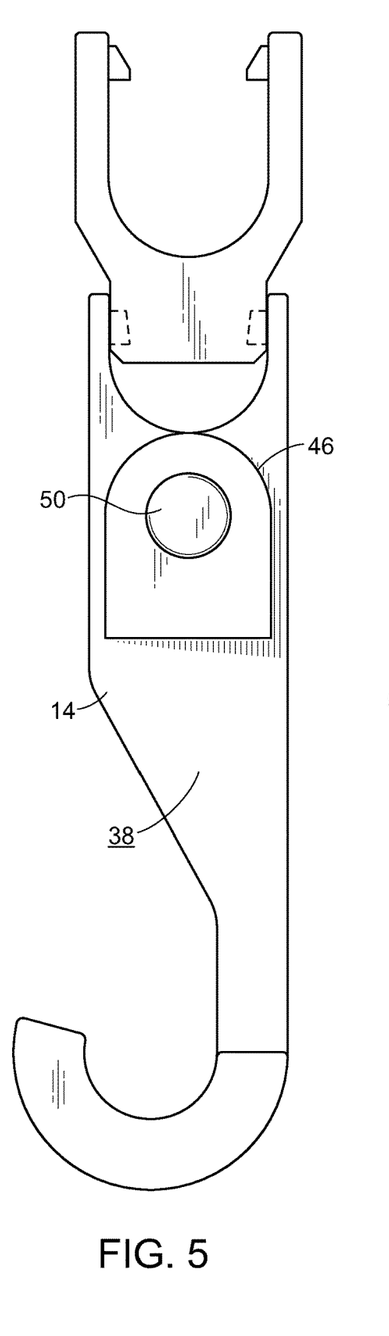
FIG. 5 is an elevational view of the inner side of a first chain hook of FIG. 1B shown with a chain link attached thereto.
Figure 6:
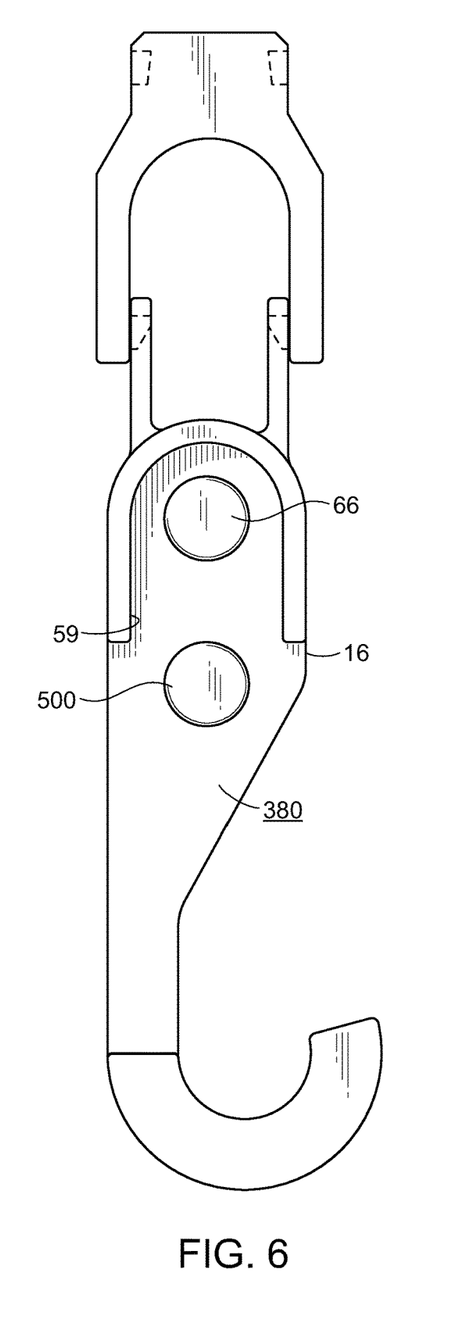
FIG. 6 is an elevational view of the inner side of a second chain hook of FIG. 1B shown with a chain link attached thereto.

FIGS. 5 and 6 show the first and second chain hooks 14 and 16 respectively with the inner sidewalls 38 and 380 of the first and second chain hooks facing the viewer and the chain hooks aligned on the paper axially. FIGS. 5 and 6 clearly show how the first magnet 50 aligns with and magnetically couples to the plate 66 when the first and second chain hooks are coupled one to the other. Further, the FIGS. 5 and 6 show the alignment of the groove 59 and flange 46 and the position thereof on each of the first and second chain hooks 15 and 16 respectively.

In use, the first and second chain hooks 15 and 16 are slideably connectible one to the other. As show in FIG. 7, a user can position the first and second chain hooks with the inner sidewalls of the first and second chain hooks 38, 380 facing one another and adjacent one to the to other. By sliding the first and second chain hooks 14, 16 relative to one another and moving the protrusion 36 towards and into the arcuate member 57 of the second hook body 240, the chain hooks are secured one to the other via the engagement between the flange 46 and groove 59. The flange 46 and groove 59 cooperate to removably attach the first and second chain hooks 14, 16 one to the other. In the coupled position the first magnet 50 is magnetically coupled to the plate 66 further securing the connection between the first and second chain hooks 14 and 16 respectively.

Figure 8:
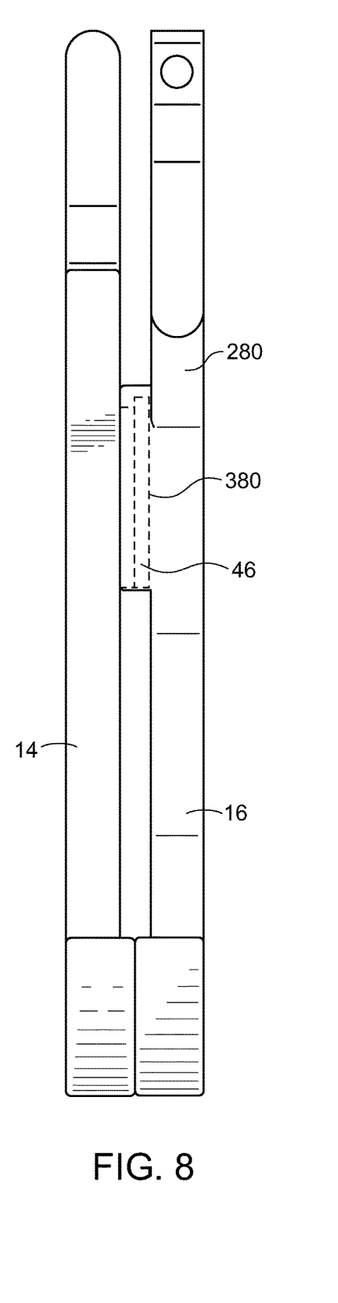
FIG. 8 is an elevational end view of the first and second chain hooks and chain links of FIGS. 5 and 6 shown coupled one to the other.
Figure 9:
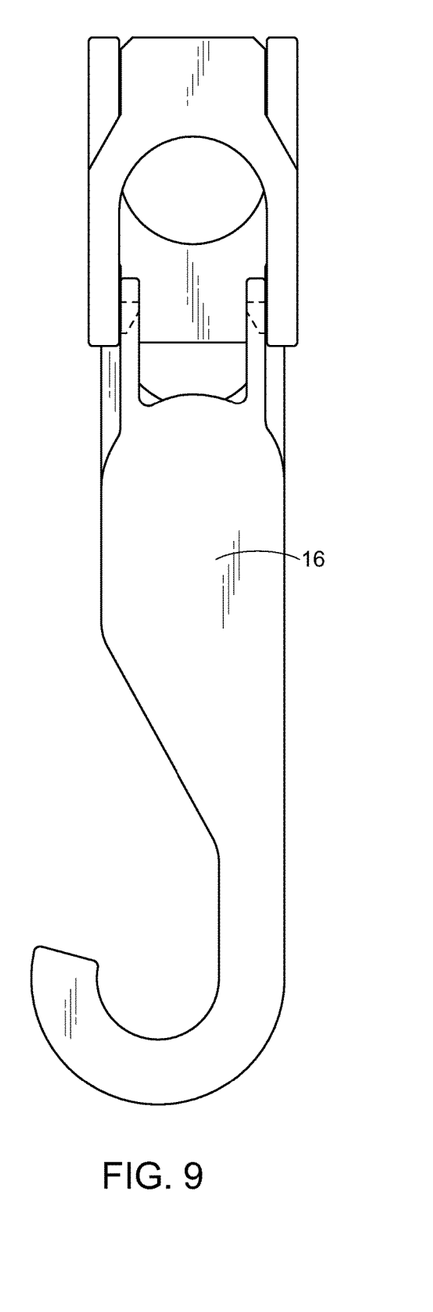
FIG. 9 is an elevational side view of the first and second chain hooks and chain links of FIGS. 5 and 6 shown coupled one to the other.

Referring to FIG. 8, in one embodiment of a chain according to the present disclosure, the first and second chain hooks 14 and 16 form a continuous hook 32, 320 when coupled one to the other, for supporting a hanging pot 18 or another object. The inner surfaces 33 and 330 of the semi-circular shaped member 32 and second semi-circular shaped member 320 abut and align one with the other to form the continuous hook 32, 320. In the connected position the outer surface 49 of the protrusion 36 abuts and is secured adjacent to the inner sidewall 380 of the second chain hook 16.

Figure 7:
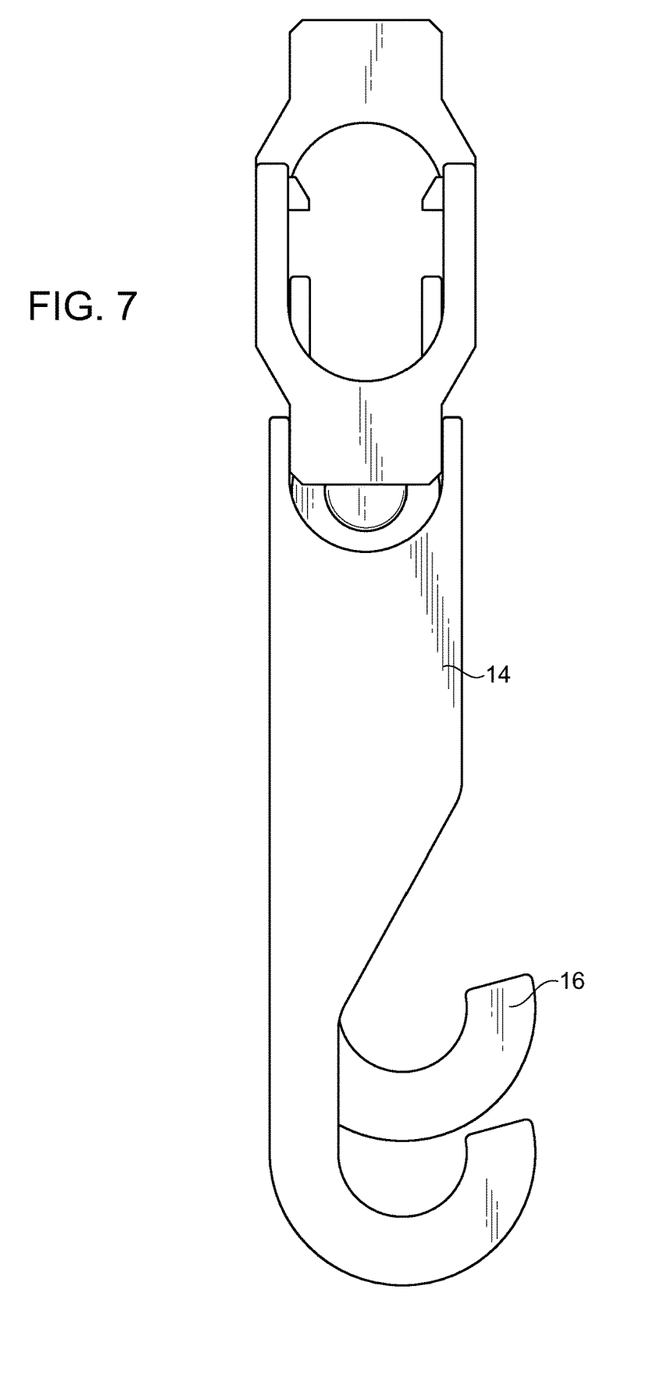
FIG. 7 is an elevational side view of the first and second chain hooks and links of FIGS. 5 and 6 shown attached one to the other via the first and second magnets coupled to the first and second chain hooks respectively.

While attaching the first and second chain hooks 14 and 16 respectively, the first and second magnet are positioned as set forth hereinabove to facilitate bringing the inner sidewalls 38 and 380 of the first and second chain hooks together and aligned as shown in FIG. 7 for connecting the flange 46 and groove 59 of the respective first and second chain hooks 14 and 16. The first and second magnets 50, 500 are arranged so a user can simply toss one hook of the hanger chain 10 over or around a tree branch, and the hooks will tend to snap together in the position of FIG. 7 due to the magnetic force and attraction between the first and second magnets 50 and 500 respectively. Without the first and second magnets 50, 500 the task of coupling the first and second chain hooks one to the other is more of a challenge.

In one embodiment the chain 12 and hooks 14 and 16 can be formed of plastic for use in lightweight hanger applications or for other uses. In other embodiments, the first and second hooks 14 and 16 and chain 12 can be formed of steel and used in industrial applications such as logging, rigging or in other industries. For example, in a logging application the chain 12 and first and second hooks 14, 16 respectively can be used to grasp a log for dragging the log or loading the log on a truck.

Example embodiments and methods thus being described, it will be appreciated by one skilled in the art that example embodiments may be varied through routine experimentation and without further inventive activity. Variations are not to be regarded as departure from the spirit and scope of the exemplary embodiments, and all such modifications as would be obvious to one skilled in the art are intended to be included within the scope of the following claims.

What is claimed is:

1. A pair of hooks for use with an adjustable length chain, the pair of hooks comprising:
    a first hook having a first hook end and a first link end, the first hook end defining a first hook for suspending an article therefrom, the first link end defining a first link member connectable to an adjustable length chain comprising a plurality of chain links connected one to the other, each of the chain links defining a male end and a female end;

the first hook comprising a first body portion disposed between the first hook and the first link member, the first body portion defining a first coupler extending outwardly from the first body portion, the first link member comprising a pair of legs extending outwardly from the first body portion and defining a link opening formed between the legs, each leg defining a pivot pin extending outwardly and generally perpendicular to an end portion of the leg, the link opening for receiving a male end of a chain link therebetween, the pivot pins being pivotably connectable to the male end of the chain link;

a second hook having a second hook end and a second link end, the second hook end defining a second hook for suspending an article therefrom, the second link end defining a second link member for coupling the second hook to an end of a hanger chain;

the second hook comprising a second body portion disposed between the second hook and the second link member, the second body portion defining a second coupler extending outwardly from the second body portion, the second link member comprising a pair of spaced apart male legs extending axially outwardly from the second body portion and configured to fit between the female end of a chain link, each male leg defining a hole for connecting with a pivot pin of a female end of the chain link;

the first and second couplers configured to connect one to the other for attaching the first hook adjacent to the second hook, the first and second hooks forming a continuous hook member when coupled adjacent one to the other.

2. The pair of hooks in accordance with claim 1 wherein the first and second couplers are slideably movable relative to one another between a release position and a connected position.

3. The pair of hooks in accordance with claim 1 further comprising a pair of magnets including a first magnet coupled to the first body portion of the first hook, and a second magnet coupled to the second body portion of the second hook, the first and second magnets being arranged so that a magnetic force between the first and second magnets when the first magnet is placed near the second magnet attracts the first hook towards the second hook.

4. The pair of hooks in accordance with claim 1 wherein the first and second magnets are arranged so that the attractive force between the first magnet and the second magnet aid in positioning the first and second hooks for attaching the first hook to the second hook via the first and second couplers.

5. The pair of hooks in accordance with claim 1 wherein the second hook further comprises a ferromagnetic plate attached to the second hook for securing the second hook to the first hook when the first and second hooks are coupled together.

6. The pair of hooks in accordance with claim 1 wherein the first coupler defines a protrusion extending outwardly from a sidewall of the first hooks, the protrusion defining a flange extending about a perimeter of the protrusion.

7. The pair of hooks in accordance with claim 1 wherein the second coupler defines an arcuate member extending about an arched end of the second hook body.

8. An adjustable length chain with mating hooks comprising:

a plurality of chain links connected one to the other forming an adjustable length chain, each of the chain links defining a male end and a female end wherein a female end of a first link of the chain is connected to a male end of a second link of the chain;

a first hook having a first hook end and a first link end, the first hook end defining a first hook for suspending an article therefrom, the first link end defining a first link member for coupling the first hook to a male end of the plurality of chain links;

the first hook comprising a first body portion disposed between the first hook and the first link member, the first body portion defining a first coupler extending outwardly from the first body portion, the first link member comprising a pair of legs extending outwardly from the first body portion and defining a link opening formed between the legs, each leg defining a pivot pin extending outwardly and generally perpendicular to an end portion of the leg, the link opening for receiving a male end of a chain link therebetween, the pivot pins being pivotably connectable to the male end of the chain link;

a second hook having a second hook end and a second link end, the second hook end defining a second hook for suspending an article therefrom, the second link end defining a second link member for coupling the second hook to female end of the plurality of chain links;

the second hook comprising a second body portion disposed between the second hook and the second link member, the second body portion defining a second coupler extending outwardly from the second body portion, the second link member comprising a pair of spaced apart male legs extending axially outwardly from the second body portion and configured to fit between the female end of a chain link, each of the male legs defining a hole for connecting with a pivot pin of a female end of the chain link;

the first and second couplers configured to connect one to the other for attaching the first hook adjacent to the second hook, the first and second hooks forming a continuous hook member when coupled adjacent one to the other.

9. The chain according to claim 8, wherein the first and second couplers are slideably movable relative to one another between a release position and a connected position.

10. The chain according to claim 8, further comprising a pair of magnets including a first magnet coupled to the first body portion of the first hook, and a second magnet coupled to the second body portion of the second hook, the first and second magnets being arranged so that a magnetic force between the first and second magnets when the first magnet is placed near the second magnet attracts the first hook towards the second hook.

11. The chain according to claim 10 wherein the first and second magnets are arranged so that the attractive force between the first magnet and the second magnet aid in positioning the first and second hooks for attaching the first hook to the second hook via the first and second couplers.

12. The chain in accordance with claim 10 wherein the second hook further comprises a ferromagnetic plate attached to the second hook body for securing the second hook to the first hook when the first and second hooks are coupled together.

13. The chain in accordance with claim 10 wherein the first coupler defines a protrusion extending outwardly from a sidewall of the first hooks, the protrusion defining a flange extending about a perimeter of the protrusion.

14. The chain in accordance with claim 10 wherein the second coupler defines an arcuate member extending about an arched end of the second hook body.

\* \* \* \* \*